(12) United States Patent
Stickley (10) Patent No.: US 10,110,049 B2
(45) Date of Patent: Oct. 23, 2018

(54) CELLULAR TELEPHONE CHARGER (71) Applicant: Jaguar Land Rover Limited, Coventry (GB)

(72) Inventor: Owen Stickley, Coventry (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 52 days.

(21) Appl. No.: 15/321,052

(22) PCT Filed: Jul. 17, 2015

(86) PCT No.: PCT/EP2015/066439
§ 371 (c)(1),
(2) Date: Dec. 21, 2016

(87) PCT Pub. No.: WO2016/009056
PCT Pub. Date: Jan. 21, 2016

(65) Prior Publication Data
US 2017/0201115 A1    Jul. 13, 2017

(30) Foreign Application Priority Data

Jul. 17, 2014    (GB) .................................. 1412741.9

(51) Int. Cl.
*H02J 7/00* (2006.01)
*H02J 7/02* (2016.01)
(Continued)

(52) U.S. Cl.
CPC .......... *H02J 7/025* (2013.01); *B60R 11/0241* (2013.01); *H02J 7/0044* (2013.01);
(Continued)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS

2010/0315038 A1    12/2010    Terao et al.
2011/0156637 A1    6/2011    Thorsell et al.
(Continued)

FOREIGN PATENT DOCUMENTS

| KR | 10-2014-0035676 A | 3/2014 |
| KR | 10-2014-0065294 A | 5/2014 |
| WO | WO 2014/157840 A1 | 10/2014 |

OTHER PUBLICATIONS

Combined Search and Examination Report, GB Application No. 1412741.9, dated Nov. 7, 2014, 7 pages.
(Continued)

*Primary Examiner* — Arun C Williams
(74) *Attorney, Agent, or Firm* — Myers Bigel, P.A.

(57) ABSTRACT

The present disclosure relates to a charger (1, 101, 201) for wirelessly charging a cellular telephone (T). The charger (1, 101, 201) comprises a housing (9, 109, 209) for receiving a portion of the cellular telephone (T), and a charging panel (7, 107, 207) comprising means (30) for wirelessly charging the cellular telephone (T). The charging panel (7, 107, 207) is movably mounted to the housing (9, 109). The charging panel (7, 107, 207) is movable between a non-charging position and a charging position.

18 Claims, 10 Drawing Sheets

(51) Int. Cl.
   *H02J 50/90*      (2016.01)
   *B60R 11/02*      (2006.01)
   *H02J 50/10*      (2016.01)
   *H04M 19/00*      (2006.01)
   *B60R 11/00*      (2006.01)

(52) U.S. Cl.
   CPC .............. *H02J 50/10* (2016.02); *H02J 50/90* (2016.02); *H04M 19/00* (2013.01); *B60R 2011/0075* (2013.01)

(58) Field of Classification Search
   USPC ........................................................ 320/108
   See application file for complete search history.

(56)            References Cited

U.S. PATENT DOCUMENTS

| | | |
|---|---|---|
| 2012/0091948 A1 | 4/2012 | Shinde et al. |
| 2012/0169276 A1 | 7/2012 | Wang et al. |
| 2012/0268238 A1 | 10/2012 | Park et al. |
| 2013/0278207 A1 | 10/2013 | Yoo |
| 2013/0324198 A1 | 12/2013 | Lachnitt |
| 2015/0326061 A1* | 11/2015 | Davison ................ H02J 7/0044 320/108 |

OTHER PUBLICATIONS

Combined Search and Examination Report, GB Application No. 1512576.8, dated Dec. 23, 2015, 7 pages.
Notification of Transmittal of the International Search Report and the Written Opinion of the International Searching Authority, or the Declaration, PCT/EP2015/066439, dated Sep. 15, 2015, 10 pages.

\* cited by examiner

CELLULAR TELEPHONE CHARGER

RELATED APPLICATIONS

This application is a 35 U.S.C. § 371 national stage application of PCT Application No. PCT/EP2015/066439, filed on Jul. 17, 2015, which claims priority from Great Britain Patent Application No. 1412741.9 filed on Jul. 17, 2014, the contents of which are incorporated herein by reference in their entireties. The above-referenced PCT International Application was published in the English language as International Publication No. WO 2016/009056 A1 on Jan. 21, 2016.

TECHNICAL FIELD

The present disclosure relates to a cellular telephone charger and particularly, but not exclusively, to a telephone charger for a vehicle. Aspects of the invention relate to an apparatus, to a charger, and to a vehicle incorporating a cellular telephone charger.

BACKGROUND

It is known to provide a charger for wirelessly charging a battery of a cellular telephone in a vehicle. This type of charger is typically in the form of a charging mat in which a transmitter coil is mounted, the transmitter coil being configured to couple with a receiver coil of the cellular telephone to charge the battery of the cellular telephone. This type of charger may cause a particular problem, in particular in all-terrain vehicles, as the cellular telephone can slide off the charging mat when the vehicle moves. Moreover, the transmitter coil of this type of charger is typically energized even when no cellular telephone is being charged, which may cause Electromagnetic Compatibility (EMC) issues with nearby electronic devices and may decrease the charging performance of the charger.

An alternate type of wireless cellular telephone charger is provided by ZENS®. This charger fits into a cup holder of a vehicle, and comprises a slot for receiving the cellular telephone. A transmitter coil is mounted in the charger and is configured to couple with a receiver coil of the cellular telephone when the cellular telephone is inserted within the slot, to charge the battery of the cellular telephone. However, in order to align the transmitter coil in the charger with the receiver coil of the cellular telephone, the charger projects above the cup holder, which may prevent a lid or panel from closing the cup holder.

At least in certain embodiments, the present invention sets out to overcome or ameliorate at least some of the problems associated with known cellular telephone chargers.

SUMMARY OF THE INVENTION

Aspects of the present invention provide an apparatus, a charger and a vehicle as claimed in the appended claims.

According to a further aspect of the present invention there is provided a charger for wirelessly charging a cellular telephone, the charger comprising:

a housing for receiving a portion of the cellular telephone, and a charging panel comprising means for wirelessly charging the cellular telephone.

The charging panel may be movably mounted to the housing. The charging panel may be movable between a non-charging position and a charging position. When the charging panel is in the non-charging position, the means for wirelessly charging the cellular telephone can be disabled so that the cellular telephone cannot be charged by the charger. When the charging panel is in the charging position, the means for wirelessly charging the cellular telephone can be activated so that the cellular telephone can be charged by the charger.

The charging panel can extend from the housing when in said charging position. The housing can be configured to receive the cellular telephone in an upright position. The charging panel can be displaced upwardly when the charging panel is moved from the non-charging position to the charging position. The charging panel can be retracted when the charging panel is in the non-charging position so as to sit flush with the housing. The charging panel can be partially or completely received in the housing when in said non-charging position. Alternatively, the charging panel can extend transversely across an end of the housing when in said non-charging position.

The housing can be configured to be disposed in a cup holder of a vehicle. A pivoting lid or sliding panel may be provided to conceal the cup holder. At least in certain embodiments, the housing can be configured to locate within the cup holder so as not to interfere with the opening/closing action of the lid when the charging panel is in the non-charging position.

The charging panel can be configured to pivot between the non-charging and charging positions. In a variant, the charging panel can be configured to translate between the non-charging and charging positions. For example, the charging panel can undergo linear translation between the non-charging and charging positions.

The means for wirelessly charging the battery can be in the form of a wireless charging unit. The wireless charging unit can comprise or consist of a transmitter coil. The transmitter coil can be configured to transmit energy to a receiver coil of the cellular telephone to charge the cellular telephone when the charging panel is in the charging position. The transmitter coil can be a spiral coil. The transmitter coil can be a planar coil. The transmitter coil can be mounted to or embedded in the charging panel. For example, the transmitter coil can be mounted to a back face of the charging panel. When the charging panel is in the charging position, the charging panel can extend from the housing to provide alignment between the transmitter coil and the receiver coil. Therefore, the configuration of the charging panel in the charger can allow an efficient inductive coupling between the transmitting and receiver coils, and can thereby ensure an efficient charging of the cellular telephone. This helps reduce or eliminate any risk of interference by other devices, such as a key fob, that uses a similar frequency from accidentally activating the charger.

The transmitter coil and the receiver coil may be automatically aligned. The charger may be configured such that when the cellular telephone is inserted into the housing the charging panel moves to the charging position to overlie the transmitter coil and receiver coil, automatically aligning the coils without further adjustment by the user.

The charger can comprise means for detecting the cellular telephone in the housing. The charger can comprise means for energizing the transmitter coil when the cellular telephone is detected by the detecting means. The detecting means can be in the form of a micro-switch. The detecting means can ensure that the charging means are deactivated when the cellular telephone is not received in the charger, and ensure that the transmitter coil is energized only when the cellular telephone is detected in the housing.

The charger can comprise means for providing a visual indication of the charging status of the cellular telephone. The means for providing a visual indication of the charging status of the cellular telephone can comprise at least one visible light source. The colour of the at least one visible light source can indicate the charging status of the cellular telephone. For example, a first colour can represent a charging state of the cellular telephone, and a second colour can represent a charged state of the cellular telephone. The at least one visible light source can be controlled with a vehicle lighting control, for example to dim the at least one visible light source with cabin lights.

The housing can have an opening for receiving the cellular telephone. The charging panel can be configured to close at least partially the opening when the charging panel is in the non-charging position. The charging panel can comprise a closure portion. The closure portion can be configured to close at least partially the opening when the charging panel is in the charging position. Therefore, the closure portion can prevent items or a finger of a user from being trapped in the housing when the charging panel moves between the non-charging and charging positions, and can thereby ensure a safe use of the charger. The closure portion can have a part-cylindrical or part-spherical configuration.

The charger can comprise a resilient member located within the housing. The resilient member can be configured to engage the cellular telephone to prevent the cellular telephone from moving relative to the housing. The resilient member can be in the form of a leaf spring.

The resilient member can be formed as a part of a securing means to hold the cellular telephone in a charging position. In this way, the cellular telephone is held in the charging position securely preventing any undesired misalignment between the receiving coil of the cellular telephone and the transmitter coil of the charger.

The charger can comprise a control means to guide the movement of the securing means so that the securing means can secure the cellular telephone after the cellular telephone has been received into the housing. In this way, the cellular telephone can be optimally received into the housing before the securing means holds the cellular telephone in a charging position. This arrangement further aids in securing cellular telephones of different sizes or thicknesses in a charging position within the housing.

The charger can comprise means for connecting the charger to an on-board power supply of the vehicle to obtain power supply from the vehicle.

The cellular telephone can comprise a battery and the charger can be configured to wirelessly charge the battery of the cellular telephone.

According to a still further aspect of the present invention there is provided a vehicle comprising a charger as described herein. The vehicle can comprise a cup holder, and the housing of the charger can be suitable for mounting in the cup holder.

The charger described herein could be installed in the vehicle during the manufacturing process, or could be installed at a dealership as an aftermarket element. Furthermore, the charger could be supplied as a kit for installation by a user.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying Figures, in which:

FIG. 2b shows an exploded view of the charger of FIG. 2a;

FIG. 4b shows a rear view of the cellular telephone charger of FIG. 4a;

DETAILED DESCRIPTION

A charger 1 in accordance with a first embodiment of the present invention will now be described with reference to FIGS. 1 to 5. The charger 1 is intended for wirelessly charging a battery B of a cellular telephone T by inductive charging. In the present embodiment, the charger 1 is intended for charging a battery B of a cellular telephone suitable for being charged based on the Qi inductive charging standard, but other charging standards could be implemented. The terms "upper" and "lower" are herein used in relation to the orientation of the charger 1 in the vehicle V and in relation to the orientation of the cellular telephone T in the charger 1.

Figure 1:
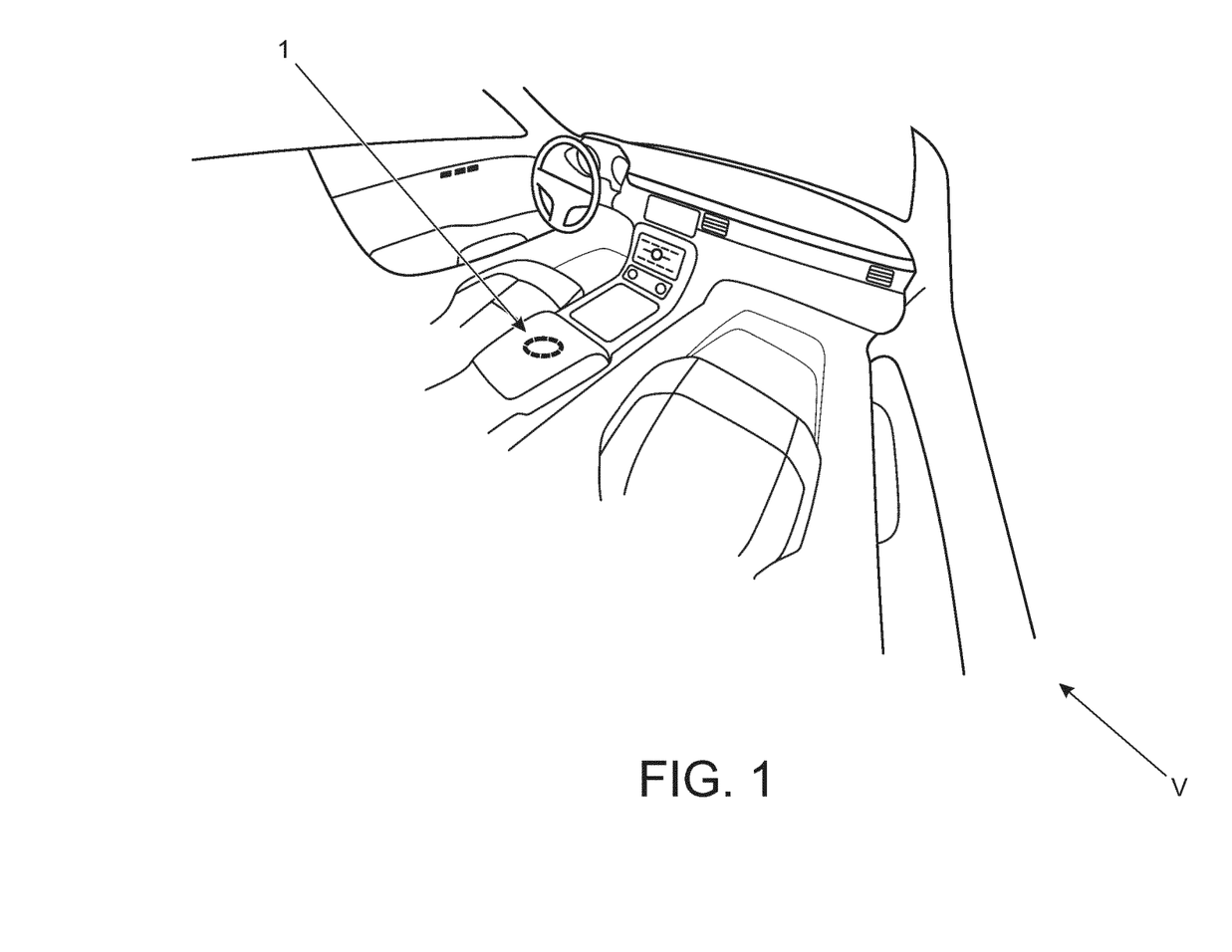
FIG. 1 shows a schematic view of a vehicle incorporating a cellular telephone charger in accordance with an embodiment of the present invention.
Figure 2A:
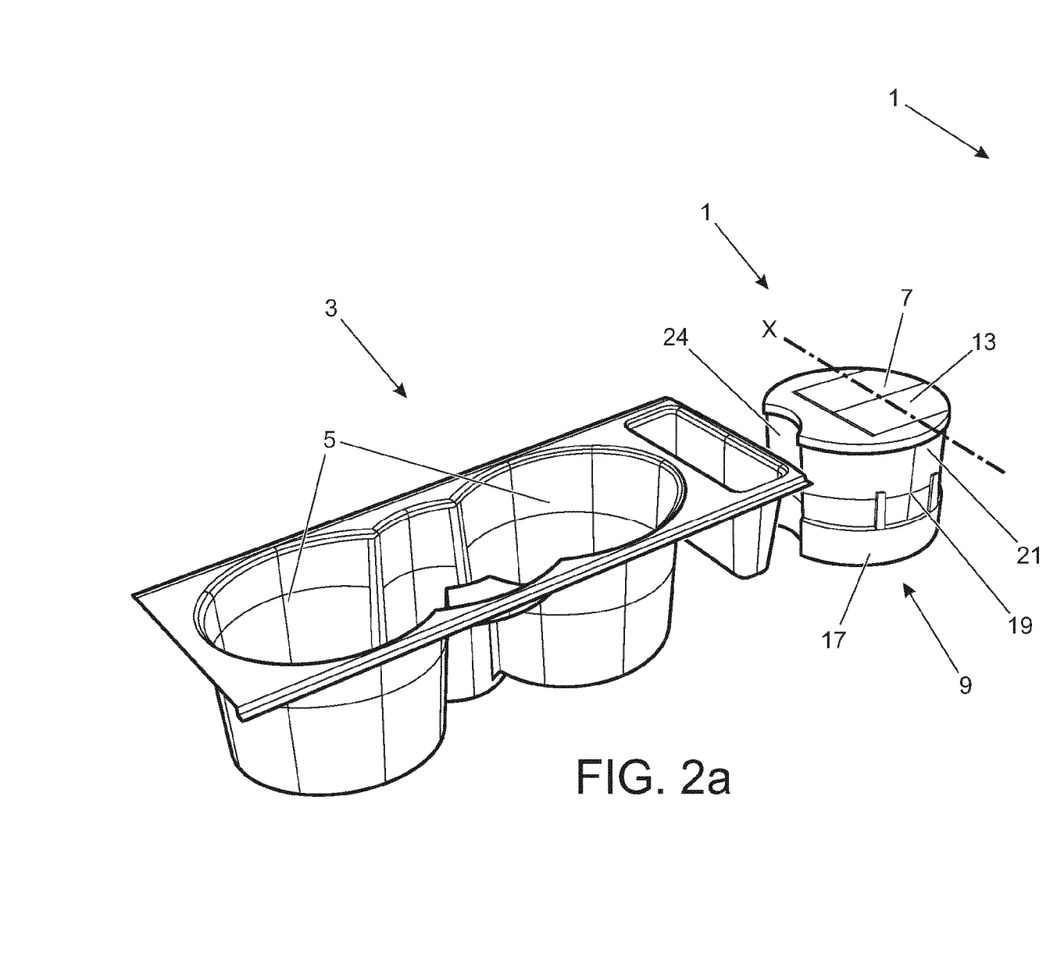
FIG. 2a shows a perspective view of the charger in accordance with an embodiment of the present invention.

The charger 1 is configured to be mounted in a cup holder 3 located inside a motor vehicle V, for example located in the centre console of a motor vehicle V. As shown in FIG. 2a, the cup holder 3 comprises first and second recesses 5, each recess 5 having a generally frusto-conical shape for receiving and holding a beverage cup. The charger 1 has a generally frusto-conical shape for being received and held within one of the recesses 5. In the present embodiment, the charger 1 is configured to be secured to the cup holder 3 in one of the recesses 5.

Figure 2B:
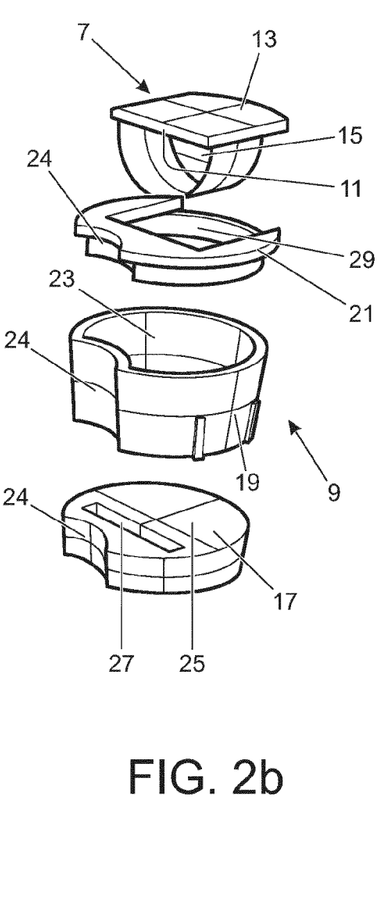
Figure 3:
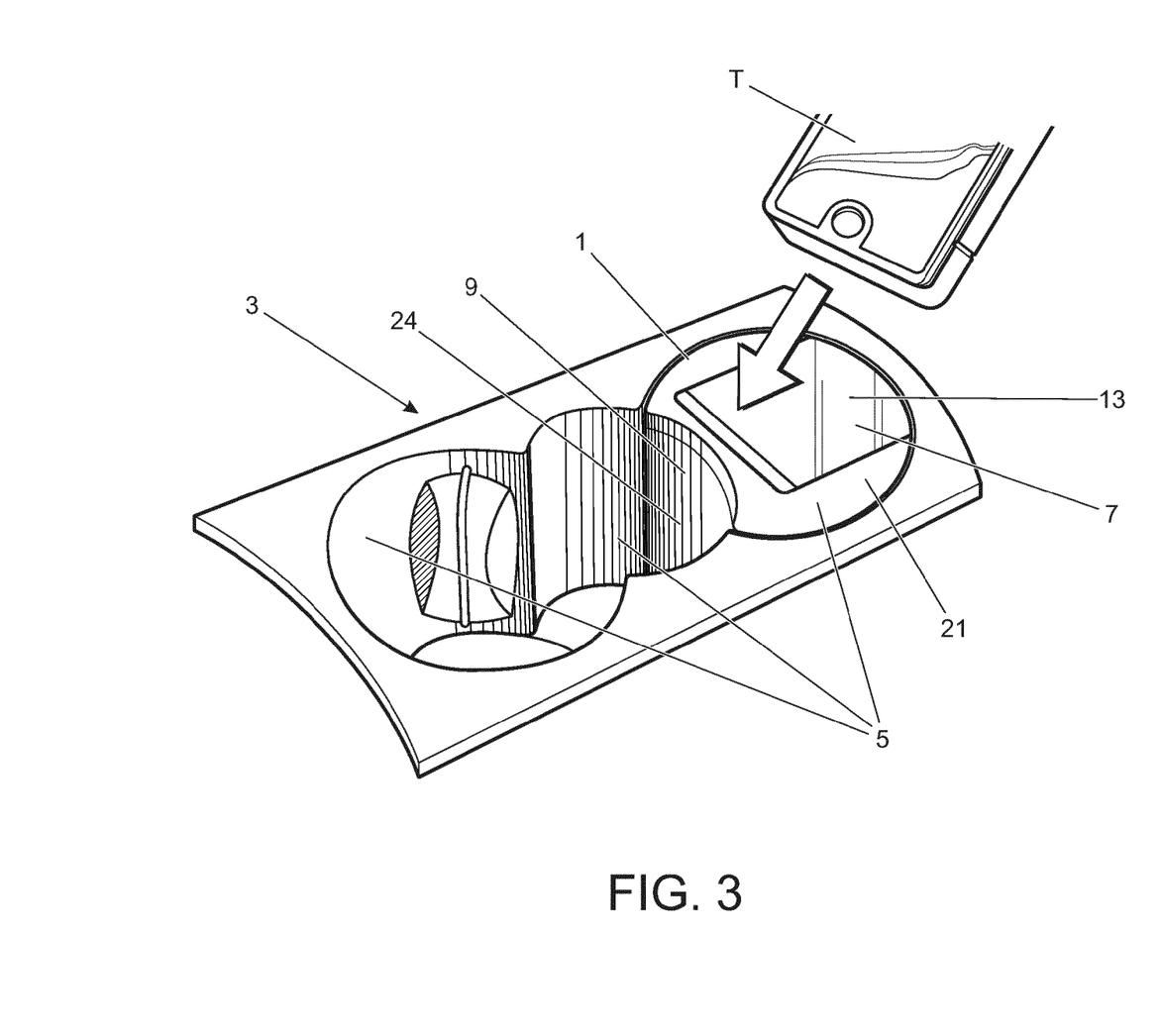
FIG. 3 shows a perspective view of the charger of FIG. 2a in a non-charging position.
Figure 4A:
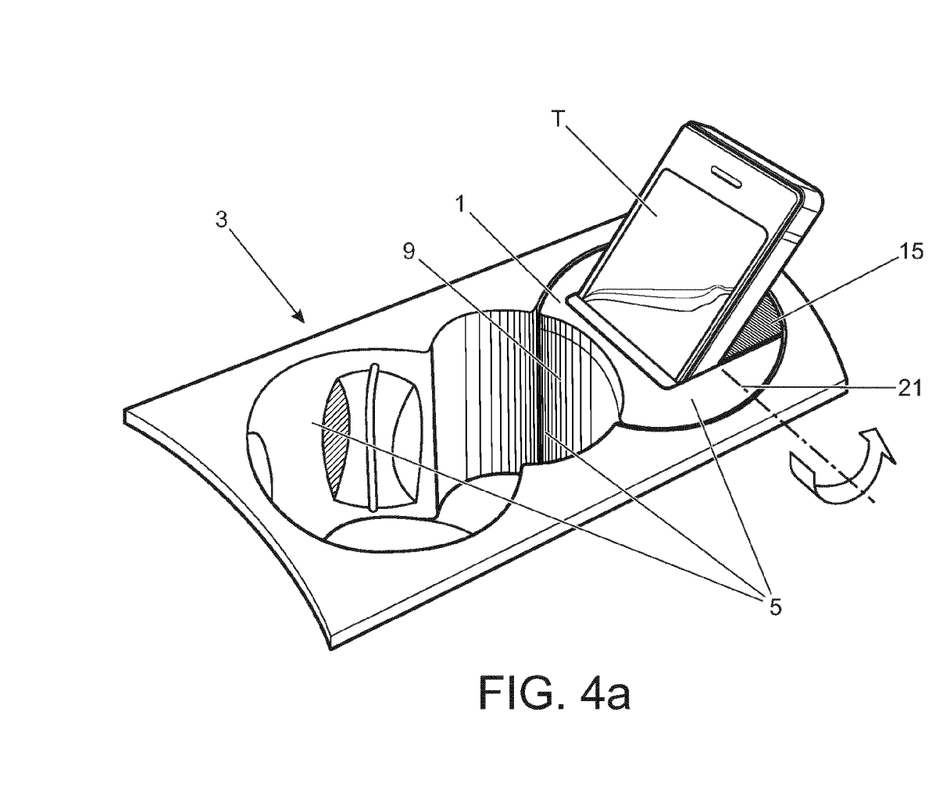
FIG. 4a shows a perspective view of the charger of FIG. 2a in a charging position.
Figure 4B:
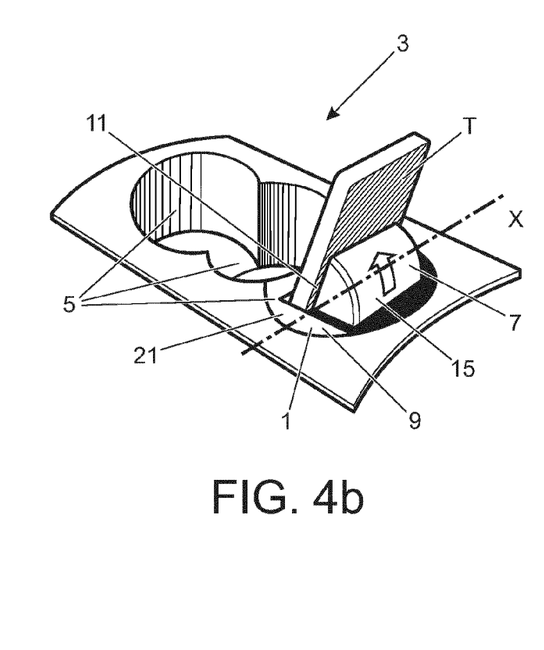

As shown in FIGS. 2a and 2b, the charger 1 comprises a charging panel 7 and a housing 9. The charging panel 7 is pivotally mounted to the housing 9 to enable rotation relative to the housing 9 about a pivot axis X. The charging panel 7 is pivotable between a non-charging position and a charging position. In the non-charging position, the charging panel 7 extends across an upper end of the housing 9 (as shown in FIG. 3). In the charging position, the charging panel 7 extends out of the housing 9 (as shown in FIGS. 4a and 4b). When the charging panel 7 is in the charging position, the charger 1 is suitable for receiving a portion of the cellular telephone T and for wirelessly charging the battery B of the cellular telephone T.

As shown in FIG. 2b, the charging panel 7 comprises an inner wall 11 and outer wall 13 opposed to the inner wall 11. When the charging panel 7 is in the non-charging position, the inner wall 11 faces inwardly and the outer wall 13 faces outwardly. The inner wall 11 is provided with a closure portion 15 configured to close at least partially the housing 9 when the charging panel 7 is in the charging position. The closure portion 15 is in the form of a part-cylindrical member arranged about the pivot axis X. When the charging panel 7 is in the non-charging position, the closure portion 15 is disposed within the housing 9. The outer wall 13 has a substantially planar upper surface for positioning adjacent to a back face of the cellular telephone T when the charging panel 7 is in its charging position.

As shown in FIG. 2b, the housing 9 comprises a base plate 17, a lateral wall 19 and a top plate 21. The base plate 17, the lateral wall 19 and the top plate 21 of the housing 9 collectively define a cavity 23 for receiving a lower portion of the cellular telephone T. The housing 9 comprises a concave recess 24 extending along the lateral wall 19, from the base plate 17 to the top plate 21. The concave recess 24 is provided so that, when the charger 1 is positioned within one of the recesses 5, the charger 1 does not encroach on the adjacent recess 5.

The base plate 17 has a generally circular shape. The base plate 17 defines an inner base wall 25 of the housing 9. The inner base wall 25 comprises a longitudinal slot 27 for receiving a bottom portion of the cellular telephone T. The longitudinal slot 27 is configured to position the cellular telephone T within the housing 9 so that the cellular telephone T faces the charging panel 7 when the bottom portion of the cellular telephone T is inserted in the longitudinal slot 27. The longitudinal slot 27 is provided with a resilient member in the form of a leaf spring (not shown). The leaf spring is located within the longitudinal slot 27. The leaf spring is configured to engage the cellular telephone T to prevent the cellular telephone T from moving relative to the housing 9.

The top plate 21 defines an opening 29. The dimensions of the opening 29 are chosen to ensure that the charging panel 7 is pivotable through the opening 29 and to ensure that, when the charging panel 7 is in the non-charging position, the charging panel 7 closes the opening 29.

The charger 1 is made of rigid plastics material. The charger 1 is covered with a soft-touch material, optionally a paint or a co-moulded elastomer, to help prevent movement of the cellular telephone T and to make the handling of the charger 1 comfortable for the user. The charger 1 is waterproofed so that the charger 1 is still operable in case of spillage.

Figure 5:
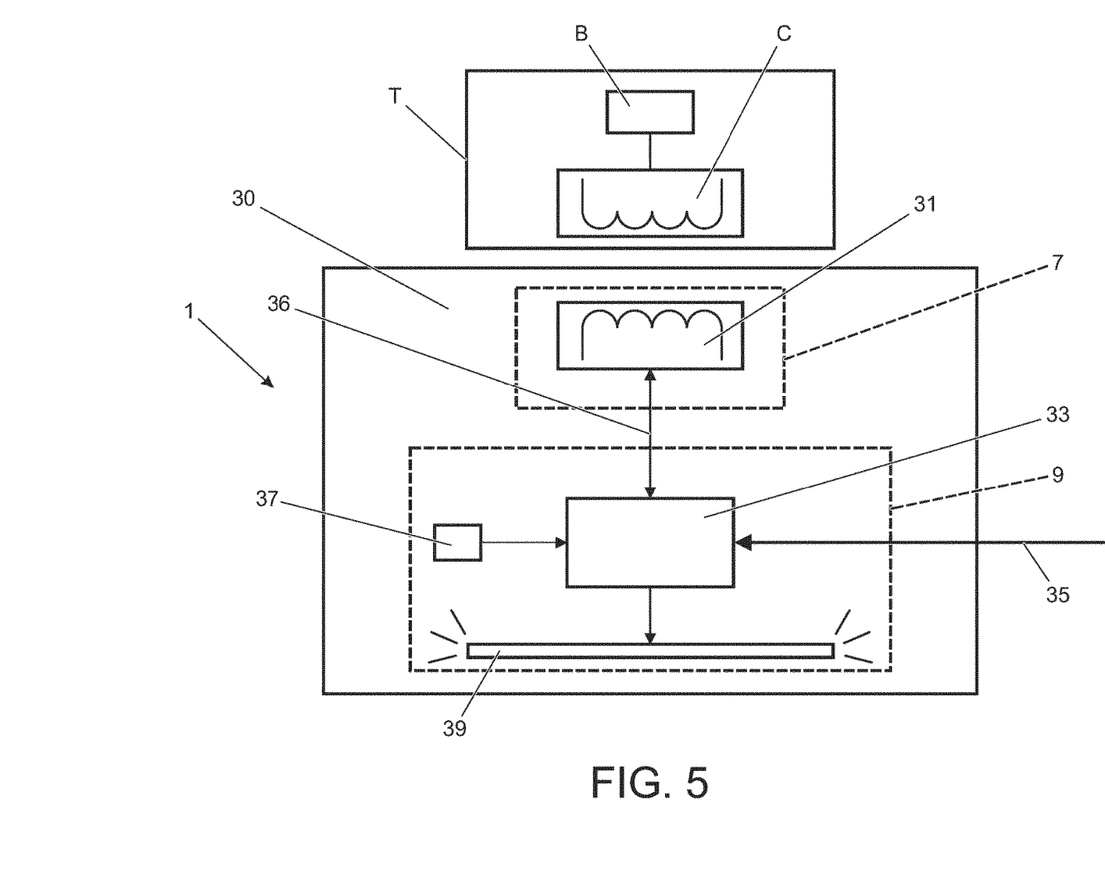
FIG. 5 shows a schematic view of a charger in accordance with an embodiment of the present invention.

As shown in FIG. 5, the charger 1 comprises means 30 for wirelessly charging the battery B of the cellular telephone T. The charging means 30 comprises a transmitter coil 31 connected to a control unit 33 mounted in the housing 9. The transmitter coil 31 is a planar coil. The transmitter coil 31 is mounted to the charging panel 7. In particular, the transmitter coil 31 is mounted to the outer wall 13 of the charging panel 7. The transmitter coil 31 is configured to generate an electromagnetic field to transmit power by inductive coupling to a receiver coil C of the cellular telephone T, to charge the battery B of the cellular telephone T. The control unit 33 is configured to control the supply of current to the transmitter coil 31 to control the electromagnetic field generated by the transmitter coil 31. The control unit 33 is configured to control the transmission of energy from the transmitter coil 31 and to regulate the energy transferred from the transmitter coil 31 to the receiver coil C to the level of energy that the battery B of the cellular telephone T requires. The control unit 33 and the transmitter coil 31 are electrically connected to each other via a fly lead 36. An electrical connector 35 is provided for connecting the charger 1 to an on-board power supply of the vehicle V, for example a 12V or a 24V supply arranged to provide power to a cigarette lighter of the vehicle V. The electrical connector 35 is configured to connect the charger 1 to the on-board power supply to obtain power from the vehicle V to energize the transmitter coil 31.

The charger 1 comprises means for detecting the cellular telephone T within the cavity 23 in the form of a micro-switch 37. The micro-switch 37 is provided in the slot 27 of the base plate 17. The micro-switch 37 is configured to detect a lower portion of the cellular telephone T within the slot 27. The micro-switch 37 is configured to send a signal to the control unit 33 when the micro-switch 37 detects the lower portion of the cellular telephone T, so that the control unit 33 energizes the transmitter coil 31. Thus, the transmitter coil 31 is only energized when the cellular telephone T is detected within the slot 27 by the micro-switch 37.

The charger 1 comprises means in the form of a strip 39 of Light Emitting Diodes (LEDs) for providing a visual indication of the charging status of the battery B of the cellular telephone T. The LEDs strip 39 comprises green LEDs and red LEDs. The LEDs strip 39 is provided on the top plate 21 of the housing 9, along a side of the opening 29. The LEDs strip 39 is controlled by the control unit 33 of the charger 1 in dependence on the charging status of the battery B. In particular, the control unit 33 is configured to illuminate the red LEDs when the battery B is being charged. Thus, whilst charging is taking place, the control unit 33 switches the red LEDs on to provide a visual indication to the user that charging of the cellular telephone T is taking place. The control unit 33 can switch the red LEDs off and switch the green LEDs on once the battery B of the cellular telephone T is fully charged, thereby providing a visual indication to the user that the charging process is completed. In a variant, the means for providing a visual indication of the charging status of the battery B could be in the form of a light pipe disposed on the top plate 21 of the housing 9 and extending about the entire circumference of the opening 29.

The operation of the charger 1 will now be described with reference to FIGS. 3 to 5. The charger 1 is secured to the cup holder 3 within the recess 5 and is electrically connected to the on-board power supply of the vehicle V via the electrical connector 35.

When the charger 1 is in the non-charging position (shown in FIG. 3), the charger 1 is deactivated and the transmitter coil 31 is not energized. The charging panel 7 closes the opening 29. The closure portion 15 extends inwardly, within the cavity 23, and is not visible from the exterior of the housing 9. The LED strip 39 is switched off.

When the battery B of the cellular telephone T needs to be charged, the charging panel 7 is pivoted upwardly from the non-charging position to the charging position (shown in FIGS. 4a and 4b). The closure portion 15 pivots with the charging panel 7 to close the housing 9. The cellular telephone T is inserted into the cavity 23 and the bottom portion of the cellular telephone T locates in the slot 27. The cellular telephone T is retained in the slot 27 via the leaf spring so that the cellular telephone T does not move relative to the housing 9 and rests against the outer wall 13 of the charging panel 7. The cellular telephone T is thereby positioned relative to the charging panel 7 such that the receiver coil C of the cellular telephone T is positioned in front of the transmitter coil 31 of the charging panel 7. The receiver coil C and the transmitter coil 31 are thus automatically aligned. When the transmitter coil 31 and the receiver coil C are aligned, the cellular telephone T is in a position in which at least a tier of the cellular telephone T remains outside of the charger 1 and visible from the exterior of the charger 1, allowing the user to see at least a portion of the screen of the cellular telephone T, for example to read text messages displayed on the screen of the cellular telephone T.

When the cellular telephone T is positioned within the cavity 23, the bottom portion of the cellular telephone T locates in the slot 27 and actuates the micro-switch 37. Once actuated, the micro-switch 37 sends a signal to the control unit 33 which energizes the transmitter coil 31. When energized, the transmitter coil 31 generates a varying electromagnetic field which induces a charging current in the receiver coil C which charges the battery B. When the charging current is induced, the control unit 33 switches the red LEDs of the LED strip 39 on to indicate that the battery B is being charged.

The control unit 33 determines when the battery B is fully charged. When the battery B is fully charged, the control unit 33 switches the red LEDs off and switches the green LEDs on to provide a visual indication to the user that charging is complete. The control unit 33 could optionally also be configured to transmit a signal to the instrument cluster or infotainment display of the vehicle to notify the user that charging has been completed.

Once the battery B of the cellular telephone T has been fully charged, the cellular telephone T is taken out of the charger 1, and the charging panel 7 is moved from the charging position to the non-charging position.

Figure 6A:
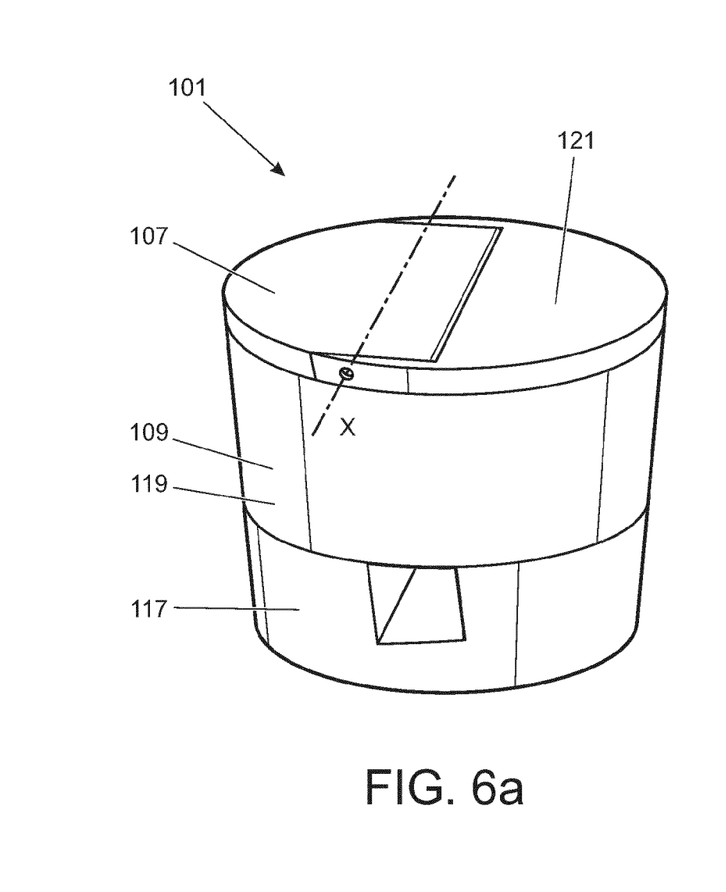
FIG. 6a shows a perspective view of a charger according to a further embodiment of the present invention, the charger being in the non-charging position.
Figure 6B:
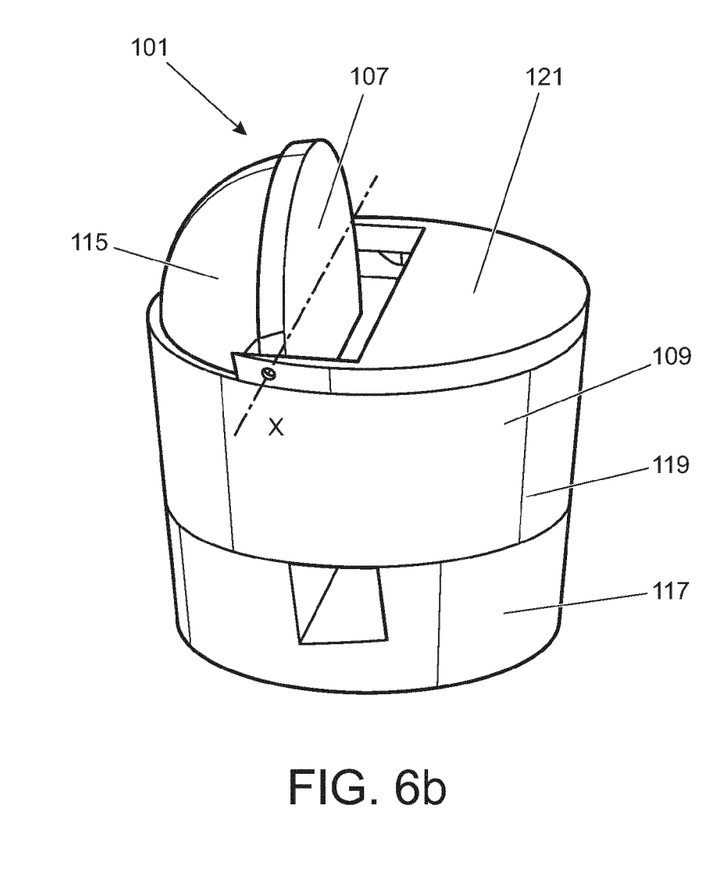
FIG. 6b shows a perspective view of the charger of FIG. 6a in the charging position.

A charger 101 according to a further embodiment of the present invention is shown in FIGS. 6a and 6b. The charger 101 corresponds closely to the charger 1 described above and like reference numerals have been used for like components, albeit incremented by 100 for clarity.

The charger 101 comprises a charging panel 107 and a housing 109. The charging panel 107 is pivotable about a pivot axis X between a non-charging position (shown in FIG. 6a) and a charging position (shown in FIG. 6b). The housing 109 comprises a base plate 117, a lateral wall 119 and a top plate 121. In the present embodiment, the concave recess is omitted from the base plate 117, the lateral wall 119 and the top plate 121.

The charging panel 107 comprises an inner wall 111 and an outer wall 113 opposed to the inner wall 111. The inner wall 111 is provided with a closure portion 115. The closure portion 115 is configured to close at least partially the housing 109 when the charging panel 107 is in the charging position. The closure portion 115 is in the form of a part-spherical member arranged about the pivot axis X.

Figure 7:
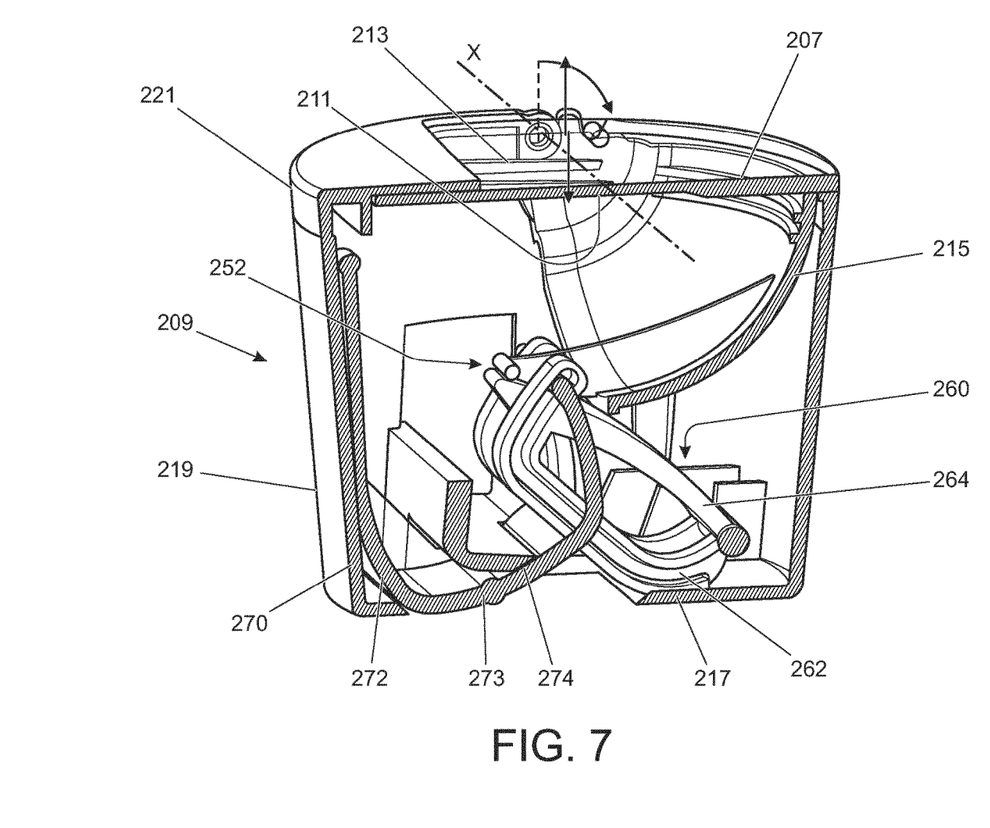
FIG. 7 shows a cross-section view of a charger in accordance with a further embodiment of the present invention when the charger is in the non-charging position.

In an embodiment shown in FIG. 7, the charger 201 comprises a charging panel 207 and a housing 209. The charging panel 207 is pivotable about a pivot axis X between a non-charging position (shown in FIG. 7) and a charging position (shown in FIG. 10). The sequence of movement of charging panel 207 from the non-charging position to the charging position is shown in FIGS. 7 to 10. The housing 209 comprises a base plate 217, a lateral wall 219 and a top plate 221.

The charging panel 207 comprises an inner wall 211 and an outer wall 213 opposed to the inner wall 211. The inner wall 211 is provided with a closure portion 215. The closure portion 215 is configured to close at least partially the housing 209 when the charging panel 207 is in the charging position. The closure portion 215 is in the form of a part-spherical member arranged about the pivot axis X.

The charger 201 comprises a securing means 270 and a control means 260. The securing means 270 and the control means 260 are in mechanical communication. The control means 260 is substantially D-shaped. The control means 260 comprises a first runner 262 and a second runner 264.

The first runner 262 is substantially c-shaped. The first runner 262 has a groove which is engageable with an end of a second arm 274 of the securing means 270. The groove is formed along the length of the first runner 262. The groove forms a channel in which the end of the second arm 274 of the securing means 270 can be engaged and slid along. The first runner 262 joins the second runner 264 at a pivot of the control means 260. The pivot of the control means 260 is attached to the housing 209. The control means 260 is formed in such a way so that the second runner 264 and the first runner 262 can be joined at the respective ends of each other as shown in FIGS. 7 to 10. A groove is formed on the upper side of the second runner 264 so that it can engage with an anchor 252 formed on the closure portion 215 of the charging panel 207.

The securing means 270 comprises a first arm 272 and the second arm 274 respectively extended from a fulcrum 273 of the securing means 270. The first arm 272 forms a resilient member. The first arm 272 extends to one end of the securing means 270 along at least a portion of the length of the lateral wall 219. The first arm 272 may be a fork shape. The first arm 272 rests against the lateral wall 219 when the charging panel is not in the charging position. The fulcrum 273 is attached to the housing 209 of the charger 201 so that the securing means 270 pivots at the base plate 217. The second arm 274 extends to another end of the securing means 270. The second arm 274 is engaged with the first runner 262 of the control means 260.

When the charging panel 207 pivots about axis X, the anchor 252, which is engaged with the second runner 264, pulls the control means 260 towards the lateral wall 219 of the housing 209 as it moves along the groove formed on the second runner 264. When the control means 264 pivots the securing means 270 also pivots as the second arm 274 of the securing means 270 moves along the groove formed on the first runner 262 of the control means 260. The securing means 270 and the control means 260 cooperate to move the resilient member between the non-charging position and the charging position.

The contact point (not shown) of the resilient member to a cellular phone may be made of resilient material, such as rubber, such that the friction holds the cellular phone and reduces or prevents damage to a surface of the cellular telephone.

The shape of the first runner 262 may depend on the shape and length of the securing means 270, of the anchor 252 and/or the size of the housing 209.

Figure 8:
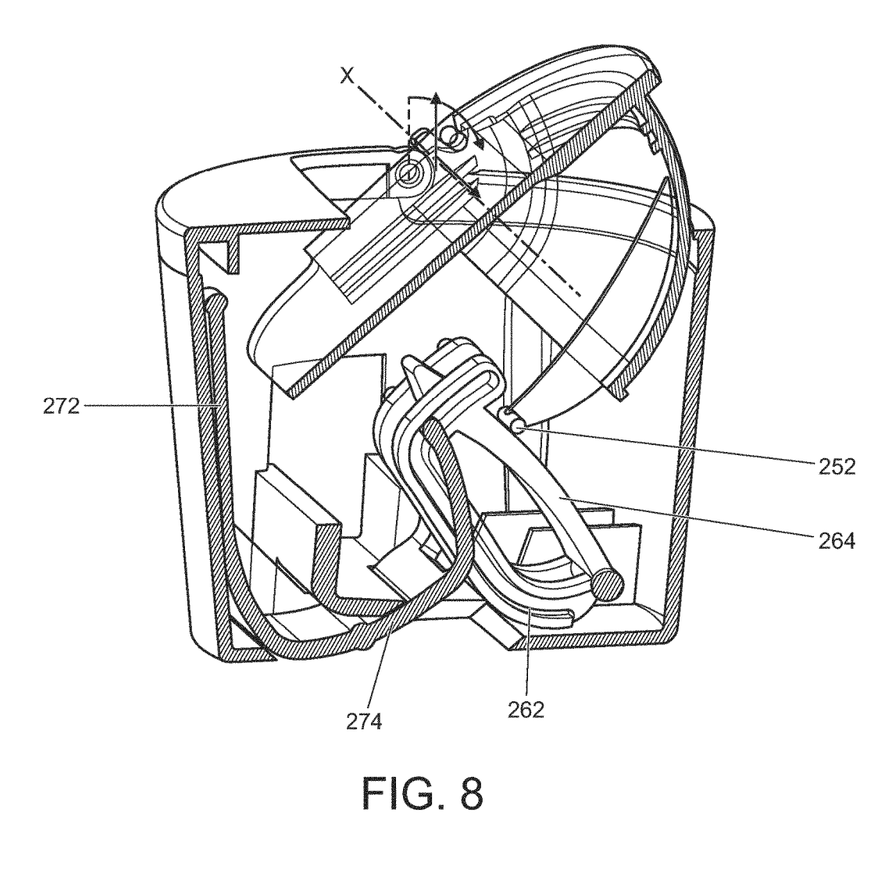
FIGS. 8 and 9 show cross-section views of the charger of FIG. 7 wherein the charger is opening up to the charging position.
Figure 9:
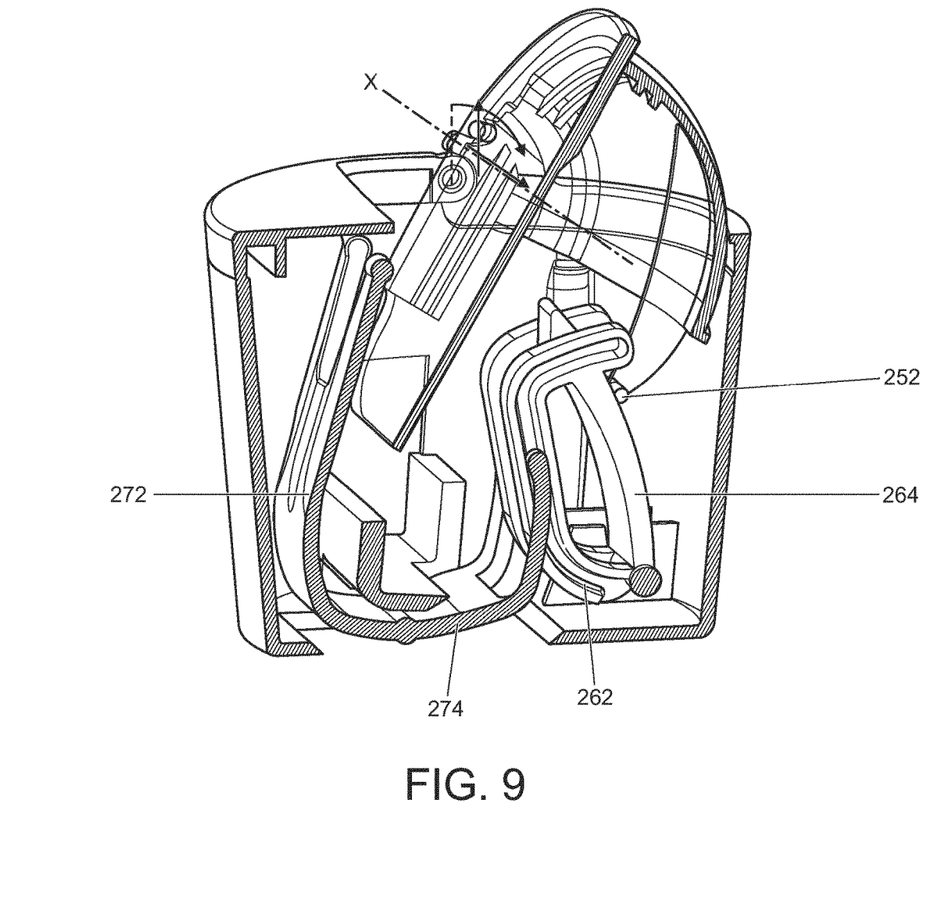

The control means 260 ensures that the charging panel 207 and the first arm 272 of the securing means 270 operate in the correct sequence and do not restrict each other's movement (shown in FIGS. 8 and 9). As shown in FIG. 9, the securing means 270 starts to move only when the second arm 274 of the securing means 270 has moved along a first portion of the first runner 262. The first arm 272 of the securing means 270 is deployed with resilience.

Figure 10:
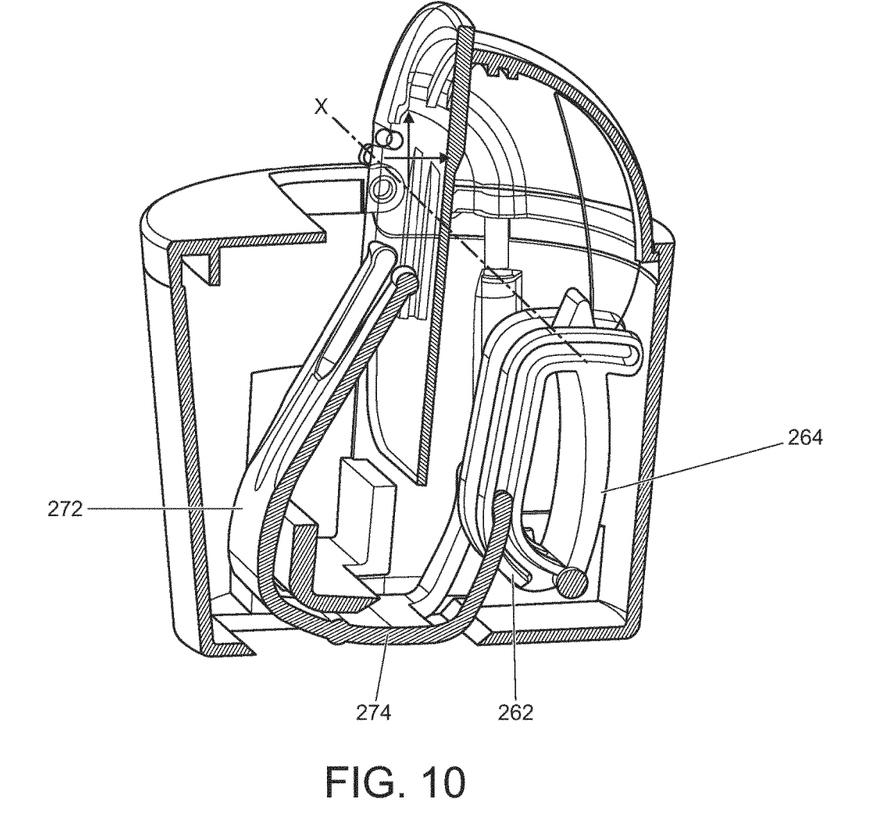
FIG. 10 shows a cross-section view of the charger of FIGS. 7 to 9 when the charger is in the charging position.

As shown in FIG. 10, when in the charging position, the securing means 270 secures a cellular telephone (not shown) to the ideal position of charging adjacent to the charging panel 207.

Thus, once the cellular telephone has been inserted, the cellular telephone will be secured in place, hindering or preventing any unwanted movement. This resilient member formed by the first arm 272 of the securing means 270 also ensures that the transmitter coil 31 of the charger 201 and the receiver coil C of the cellular telephone are aligned securely, reducing chances of misalignment and overheating which may otherwise be caused by any such misalignment.

The embodiments show that the transmitter coil 31 of the charger and the receiver coil C can be automatically aligned with only one movement of inserting a cellular telephone into the cavity. Thus, the driver will not get distracted trying to align the receiver coil of the cellular telephone to the charging panel. Also, the driver does not need to be concerned with the undesired movement of the cellular telephone whilst it is being charged.

In an embodiment, the charger comprises a biasing means (not shown), so that the biasing means urges the charging panel to be in a non-charging position, or at least not in a charging-position. The biasing means ensures that the opening of the housing is closed so that any other substances cannot enter the charger.

The biasing means can be formed by the natural weight or centre of gravity of the closure portion and/or the charging panel. The weight of the closure portion and/or the charging panel is distributed so that by default, when the cellular telephone is not inserted, the outer wall of the charging panel is on top, facing outwards. The charging panel may close the opening.

Alternatively, the biasing means comprises a weight attached or formed in the anchor region of the closure portion of the charging panel.

Alternatively, the biasing means comprises a resilient means, such as a spring, attached to the pivot of the control means so that by default the control means is pushed towards the non-charging position. The control means is pivoted toward the centre of the cavity of the housing away from the lateral wall of the housing.

Alternatively, the biasing means comprises a resilient means, such as a spring in particular a clock spring, attached to the pivoting point of the charging panel. This would then bias the charging panel towards the non-charging position.

It will be appreciated that various changes and modifications can be made to the charger described herein without departing from the scope of the present invention.

Further aspects and embodiments of the present invention are set out in the following numbered paragraphs:

1. A charger for wirelessly charging a cellular telephone, the charger comprising:
    a housing for receiving a portion of the cellular telephone, and
    a charging panel comprising a wireless charging unit for charging the cellular telephone,
    wherein the charging panel is movably mounted to the housing, the charging panel being movable between a non-charging position and a charging position.

2. A charger as described in paragraph 1, wherein the charging panel extends from the housing when the charging panel is in the charging position.

3. A charger as described in paragraph 1, wherein the charging panel is partially or completely retracted into the housing when in the non-charging position; or the charging panel extends transversely across an end of the housing when in the non-charging position.

4. A charger as described in paragraph 1, wherein the housing is configured to be mounted in a cup holder of a vehicle.

5. A charger as described in paragraph 1, wherein the charging panel comprises a transmitter coil, the transmitter coil being configured to transmit energy to a receiver coil of the cellular telephone to charge the cellular telephone when the charging panel is in the charging position.

6. A charger as described in paragraph 5, comprising a sensor for detecting the cellular telephone in the housing, and a control unit for energizing the transmitter coil when the cellular telephone is detected by the sensor.

7. A charger as described in paragraph 1, comprising a visual indicator for providing a visual indication of the charging status of the cellular telephone.

8. A charger as described in paragraph 7, wherein said visual indicator comprises at least one visible light source.

9. A charger as described in paragraph 1, the housing having an opening, wherein the charging panel is configured to close at least partially the opening when the charging panel is in the non-charging position.

10. A charger as described in paragraph 1, the housing having an opening, the charging panel comprising a closure portion, wherein the closure portion is configured to close at least partially the opening when the charging panel is in the charging position.

11. A charger as described in paragraph 1, wherein the charging panel is configured to pivot between the non-charging and charging positions.

12. A charger as described in paragraph 1, comprising a resilient member located within the housing, the resilient member being configured to engage the cellular telephone to prevent the cellular telephone from moving relative to the housing.

13. A charger as described in paragraph 1, comprising a connector for connecting the charger to an on-board power supply of the vehicle to obtain power supply from the vehicle.

14. A vehicle comprising a charger as described in paragraph 1.

15. A vehicle as described in paragraph 14, comprising a cup holder, wherein the housing of the charger is suitable for mounting in the cup holder.

The invention claimed is:

1. An apparatus for wirelessly charging a cellular telephone, the apparatus comprising:
    a housing for receiving a portion of the cellular telephone; and
    a charging panel comprising a transmitter coil configured to wirelessly charge the cellular telephone;
    wherein the charging panel is movably mounted to the housing between a non-charging position and a charging position such that in response to the cellular telephone being inserted in the housing the charging panel pivots from the non-charging position to the charging position so as to automatically align the cellular telephone for charging in the charging position.

2. The apparatus of claim 1, wherein the charging panel extends from the housing when the charging panel is in the charging position.

3. The apparatus of claim 1, wherein the charging panel is partially or completely retracted into the housing when the charging panel is in the non-charging position, or wherein the charging panel extends transversely across an end of the housing when the charging panel is in the non-charging position.

4. The apparatus of claim 1, wherein the housing is configured to be mounted in a cup holder of a vehicle.

5. The apparatus of claim 1, wherein the transmitter coil is configured to transmit energy to a receiver coil of the cellular telephone to charge the cellular telephone when the charging panel is in the charging position.

6. The apparatus of claim 5, wherein the transmitter coil and the receiver coil are automatically aligned when the cellular telephone is inserted in the housing.

7. The apparatus of claim 5, comprising a switch that detects the cellular telephone in the housing, and a control unit that energizes the transmitter coil when the cellular telephone is detected by the switch.

8. The apparatus of claim 1, further comprising a visual indicator of the charging status of the cellular telephone.

9. The apparatus of claim 8, wherein the visual indicator comprises at least one visible light source.

10. The apparatus of claim 1, wherein the housing comprises an opening, and wherein the charging panel is configured to at least partially close the opening when the charging panel is in the non-charging position.

11. The apparatus of claim 1, wherein the housing comprises an opening, wherein the charging panel comprises a closure portion, and wherein the closure portion is configured to at least partially close the opening when the charging panel is in the charging position.

12. The apparatus of claim 1, further comprising a resilient member located within the housing, wherein the resilient member is configured to engage the cellular telephone to prevent the cellular telephone from moving relative to the housing.

13. The apparatus of claim 12, wherein the resilient member is configured to hold the cellular telephone in the charging position.

14. The apparatus of claim 13, further comprising at least one arm configured to guide movement of the resilient member so that the resilient member can secure the cellular telephone after the cellular telephone has been inserted into the housing.

15. The apparatus of claim 1, further comprising a connector that connects the apparatus to an on-board power supply of a vehicle to obtain power supply from the vehicle.

16. A vehicle comprising the apparatus of claim 1.

17. The vehicle of claim 16, further comprising a cup holder, and wherein the housing of the apparatus is configured to be mounted within the cup holder.

18. The apparatus of claim 6, wherein the transmitter coil and the receiver coil are automatically aligned only when the cellular telephone is fully inserted in the housing.

* * * * *